(12) United States Patent
Hozumi

(10) Patent No.: US 10,597,804 B2
(45) Date of Patent: Mar. 24, 2020

(54) MULTIPLE WOVEN GAUZE FABRIC

(71) Applicant: Uchino Co., Ltd., Tokyo (JP)

(72) Inventor: Shuichi Hozumi, Tokyo (JP)

(73) Assignee: UCHINO CO., LTD., Tokyo (JP)

(*) Notice: Subject to any disclaimer, the term of this patent is extended or adjusted under 35 U.S.C. 154(b) by 0 days.

(21) Appl. No.: 15/754,946

(22) PCT Filed: Aug. 24, 2015

(86) PCT No.: PCT/JP2015/073668
§ 371 (c)(1),
(2) Date: Feb. 23, 2018

(87) PCT Pub. No.: WO2017/033252
PCT Pub. Date: Mar. 2, 2017

(65) Prior Publication Data
US 2019/0062961 A1   Feb. 28, 2019

(51) Int. Cl.
*D03D 19/00* (2006.01)
*D03D 11/00* (2006.01)
(Continued)

(52) U.S. Cl.
CPC ............ *D03D 19/00* (2013.01); *B32B 3/28* (2013.01); *B32B 5/024* (2013.01); *B32B 5/26* (2013.01); *B32B 7/02* (2013.01); *B32B 7/14* (2013.01); *B32B 37/0084* (2013.01); *B32B 37/144* (2013.01); *B32B 38/0012* (2013.01);
(Continued)

(58) Field of Classification Search
CPC ............ D03D 19/00; B32B 5/024; B32B 5/26
See application file for complete search history.

(56) References Cited

U.S. PATENT DOCUMENTS 6,207,597 B1 *   3/2001   Ogita .................. D03D 11/00
428/909

FOREIGN PATENT DOCUMENTS

| CN | 102926073 A | 2/2013 |
| JP | H05-272026 A | 10/1993 |

(Continued)

OTHER PUBLICATIONS

WIPO, Japanese International Search Authority, International Search Report (English and Japanese) and Written Opinion (Japanese only) dated Nov. 2, 2015 in International Patent Application No. PCT/JP2015/073688, 10 pages.

(Continued)

*Primary Examiner* — Philip C Tucker
*Assistant Examiner* — John Blades
(74) *Attorney, Agent, or Firm* — Masuvalley & Partners

(57) ABSTRACT

Provided is a multiple woven gauze fabric capable of controlling the degree of wrinkling according to use. A double woven gauze fabric is formed by stacking a front surface gauze structure A and a back surface gauze structure B. The front surface gauze structure A and the back surface gauze structure B are formed, and the front surface gauze structure A and the back surface gauze structure B are joined, as appropriate. The front surface gauze structure A is composed of a non-twist yarn, and the back surface gauze structure B is composed of a hollow yarn. That is, a gauze structure composed only of twisted yarn (solid yarn) is not included. The degree of wrinkling is controlled by considering the hollow rate of the hollow yarn.

1 Claim, 4 Drawing Sheets

(51) Int. Cl.
*D03D 15/00* (2006.01)
*D03D 9/00* (2006.01)
*B32B 3/28* (2006.01)
*B32B 5/02* (2006.01)
*B32B 5/26* (2006.01)
*B32B 7/02* (2019.01)
*B32B 7/14* (2006.01)
*B32B 37/00* (2006.01)
*B32B 37/14* (2006.01)
*B32B 38/00* (2006.01)
*D03D 1/00* (2006.01)
*D03D 13/00* (2006.01)
*D03D 15/04* (2006.01)

(52) U.S. Cl.
CPC ............ *D03D 1/0017* (2013.01); *D03D 9/00* (2013.01); *D03D 11/00* (2013.01); *D03D 13/004* (2013.01); *D03D 15/0033* (2013.01); *D03D 15/0077* (2013.01); *D03D 15/0083* (2013.01); *D03D 15/04* (2013.01); *B32B 2250/20* (2013.01); *B32B 2262/062* (2013.01); *B32B 2305/188* (2013.01); *B32B 2307/304* (2013.01); *B32B 2307/724* (2013.01); *B32B 2317/18* (2013.01); *B32B 2437/00* (2013.01); *B32B 2555/00* (2013.01); *D03D 2700/0111* (2013.01); *D03D 2700/0174* (2013.01); *D10B 2201/02* (2013.01); *D10B 2501/02* (2013.01); *D10B 2501/04* (2013.01); *D10B 2503/06* (2013.01)

(56) References Cited

FOREIGN PATENT DOCUMENTS

| | | | | |
|---|---|---|---|---|
| JP | 2003-310347 | A | 10/2003 | |
| JP | 2012-255246 | A | 12/2012 | |
| JP | 2013-007149 | * | 1/2013 | ............... D02G 3/24 |
| JP | 2013-007149 | A | 1/2013 | |
| JP | 3189066 | U | 2/2014 | |
| JP | 5435607 | B1 | 3/2014 | |
| JP | 5737735 | B1 | 6/2015 | |
| TW | 475953 | B | 2/2002 | |

OTHER PUBLICATIONS

Chinese intellectual Property Office; Patent Office Action dated Dec. 11, 2019, issued in corresponding Chinese Patent Application No. 20158008262628.3, 6 pages.

* cited by examiner

Typical double woven gauze fabric

MULTIPLE WOVEN GAUZE FABRIC

RELATED APPLICATIONS

This application is the U.S. National Phase of and claims priority to International Patent Application No. PCT/JP2015/073668, International Filing Date Aug. 24, 2015, entitled Multiple Woven Gauze Fabric, which is incorporated herein by reference in its entirety.

TECHNICAL FIELD

The present invention relates to a multiple woven gauze fabric.

BACKGROUND ART

The woven gauze fabric is a coarse-meshed plain-woven fabric. Generally, a solid (non-hollow) twisted cotton yarn is used. A cotton woven gauze fabric is classified into a single woven fabric, a double woven fabric, and a triple woven fabric. A single woven gauze fabric is, for example, used for the medical use and dishcloth. A double woven gauze fabric is, for example, used for clothing and handkerchief. A cotton yarn (single yarn of 40 count) is used. A triple woven gauze fabric is, for example, used for towel and bed and bedding. A cotton yarn is used. Generally, a single weave construction is dense with the total 50-120 warp yarns and weft yarns per inch. The gauze is not formed with the density of less than 50 yarns per inch. Generally, a fabric of the density beyond 120 yarns per inch is not referred to as gauze.

FIG. 14 is a detailed cross-sectional view illustrating a typical double woven gauze fabric. The double woven gauze fabric is composed of a surface-layer gauze weave construction A and a back-layer gauze weave construction B. The gauze weave construction is composed of a warp yarn (lengthwise yarns on a loom) and a weft yarn (crosswise yarns on a loom). The gauze weave construction is formed by drawing the weft yarn across the warp yarn while the warp yarn is supplied. Concurrent with the formation of the surface-layer gauze weave construction A and the back-layer gauze weave construction B, the surface-layer gauze weave construction A and the back-layer gauze weave construction B are joined, as appropriate. As shown in FIG. 14, a connection part may be formed by the warp yarn or may be formed by the weft yarn.

The gauze is a coarse-meshed (largely gapped between yarns) fabric. From one viewpoint, the gauze has an excellent breathability and a high lightweight property because the gauze is a coarse-meshed plain-woven fabric.

From another viewpoint, the woven gauze fabric is poor in heat-retaining property. The woven gauze fabric is thin even when it is formed into a multi-ply gauze, so that the heat-retaining property cannot be expected. When the woven gauze fabric is formed with more number of layers for the sake of securing the sufficient heat-retaining property, the lightweight property is degraded largely.

Because the gauze is a coarse-meshed fabric, the gauze is poor in bounce and softness.

Because the gauze is a coarse-meshed fabric, for example, if the gauze is used for clothes, the skin is seen through via the clothes made of gauze. If the gauze is formed with a thicker yarn or is formed highly dense, a transparency preventing property improves but the breathability and the lightweight property, which are characteristics of gauze, are degraded largely.

For the reasons as set forth above, properties of the conventional woven gauze fabric are not enough when the woven gauze fabric is applied to cloth for clothes and beddings. Therefore, the inventors of the present application considered that there is something more to do for improving the woven gauze fabric.

Meanwhile, non-twisted yarn-made piles are sometimes used for a pile towel.

A generally used twisted yarn is formed by twisting fibers made of raw cotton. To the contrary, the non-twisted yarn is formed by untwisting a twisted yarn to return the yarn to a non-twisted state.

The non-twisted yarn puffs up softly and contains much air between fibers. Therefore, a non-twisted yarn-made pile achieves the heat-retaining property and a soft touch feeling.

Here, application of the non-twisted yarn to the woven gauze fabric is studied. A non-twisted yarn-made gauze weave construction has a bulkiness, while retaining the breathability and the lightweight property, more than a twisted yarn-made gauze weave construction. As a result, the heat-retaining property, the soft touch feeling, and the transparency preventing property improve.

Generally, the non-twisted yarn has less strength than the twisted yarn. Therefore, a gauze weave construction composed only of non-twisted yarn has less strength. Even when the non-twisted yarn-made gauze weave construction is formed into a multi-ply gauze, a remarkable improvement in strength is not expected.

Taking the above into consideration, the inventors of the present application studied about the application of the non-twisted yarn to a multiple woven gauze fabric in such a manner that a gauze weave construction composed of twisted yarn and a gauze weave construction composed of non-twisted yarn are joined together.

While the gauze weave construction composed of twisted yarn retains the strength, the gauze weave construction composed of non-twisted yarn has the heat-retaining property, the soft touch feeling, and the transparency preventing property. That is, the multiple woven gauze fabric comes to have properties both weave constructions have.

The applicant of the present application has already proposed the related invention according to, for example, the Patent Literature 1.

CITATION LIST

Patent Literature

Patent Literature 1

JP 5435607B

SUMMARY OF INVENTION

Technical Problem

Further description will be made below with respect to the multiple woven gauze fabric formed by joining the gauze weave construction composed of twisted yarn and the gauze weave construction composed of non-twisted yarn.

The gauze weave construction is formed by supplying a weft yarn to a warp yarn. After the gauze weave construction is formed, if the gauze weave construction is subjected to a water impregnation process, for example, via washing and dying and a subsequent drying process, the gauze weave construction shrinks. At the time, a shrinkage rate differs between the gauze weave construction composed of twisted yarn and the gauze weave construction composed of non-twisted yarn. In other words, the twisted yarn is likely to shrink but the non-twisted yarn is hard to shrink.

As a result, the gauze weave construction composed of non-twisted yarn cannot follow the shrinking of the gauze weave construction composed of twisted yarn and thus puffs up. When the gauze weave construction composed of non-twisted yarn puffs up largely, wrinkles are easy to generate. The wrinkles, however, has both merits and demerits.

Initially, merits will be described below. The wrinkles can produce further bulkiness while the breathability and the lightweight property is retained. As a result, the heat-retaining property, the soft touch feeling, and the transparency preventing property improve more. Some of the customers prefer unique flavor resulting from the wrinkles.

Next, demerits will be described below. When the wrinkles become larger (or increase), a sewing process becomes difficult. Further, printing of a picture pattern becomes difficult. Further, in a case where the picture pattern is formed by using different colors of yarns, the picture pattern may be deformed. Still further, the wrinkles are not preferred for some kinds of clothes.

Therefore, in some cases, it is preferred to suppress generation of wrinkles.

The generation of wrinkles can be suppressed to some extent by controlling a joining interval. More specifically, by narrowing the joining interval to limit shrinkage of the gauze weave construction composed of twisted yarn, the generation of wrinkles can be suppressed. Further, when looseness of the gauze weave construction composed of non-twisted yarn is divided into small sections by forming connection parts, the generation of wrinkles can be suppressed. As described above, narrower joining interval works for suppression of wrinkles.

Incidentally, narrower joining interval increases the number of connection parts, which also increases undesirable man-hours. Further, narrower joining interval invites restriction of design. Still further, specially, in a case of a double woven gauze fabric, undesirable stress is generated and the cloth itself curves according to a puffing direction of the gauze weave construction composed of non-twisted yarn because of limiting of the shrinkage of the gauze weave construction composed of twisted yarn. This makes sewing and printing difficult.

The present invention was made to solve the above described problem. Therefore, a purpose of the present invention is to provide a multiple woven gauze fabric capable of controlling a degree of generation of wrinkles according to the use thereof.

Solution to Problem

The multiple woven gauze fabric according to the invention of the present application that solves the above described problem comprises at least a first gauze weave construction, a second gauze weave construction, and a plurality of connection parts joining the first gauze weave construction and the second gauze weave construction. The first gauze weave construction comprises a non-twisted yarn and the second gauze weave construction comprises a hollow yarn.

In the above described invention, preferably, a hollow ratio of the hollow yarn is 20-50%.

By studying the hollow ratio of the hollow yarn, a shrinkage rate of the second gauze weave construction is controlled and a degree of generation of wrinkles is controlled.

In the above described invention, preferably, a connection part comprises a plurality of connection parts, and the first gauze weave construction and the second gauze weave construction cross to each other at connection parts to be alternately replaced between the front surface and the back surface.

When the first gauze weave construction and the second gauze weave construction cross to each other at connection parts regularly to be alternately replaced between the front surface and the back surface, both the front surface and the back surface are sectioned to form a lattice shape which is arranged continuously, regularly, and repeatedly. A limitation of a size of lattice shape can be reduced. This makes a degree of freedom of design high.

In the above described invention, preferably, the first gauze weave construction and the second gauze weave construction cross to each other at connection parts irregularly to be alternately replaced between the front surface and the back surface.

The degree of generation of wrinkles is controlled by studying the hollow ratio of the hollow yarn. In other words, the first gauze weave construction and the second gauze weave construction are not necessarily sectioned to form the lattice shape and may cross to each other at connection parts irregularly to be alternately replaced between the front surface and the back surface. This allows formation of a free picture pattern. That is, the freedom of design becomes high.

In the above described invention, further preferably, the multiple woven gauze fabric is a double woven gauze fabric.

In the above described invention, still further preferably, the non-twisted yarn and the hollow yarn are cotton yarns.

Advantageous Effect of Invention

In the multiple woven gauze fabric of the present invention, a degree of generation of wrinkles can be controlled according to the use thereof.

DESCRIPTION OF EMBODIMENTS

First Embodiment

~Weave Construction~

Figure 14:
FIG. 14 is a detailed cross-sectional view of a typical double woven gauze fabric.

A double gauze fabric according to a first embodiment has the basic weave construction identical to that of the typical double gauze (see, FIG. 14). In other words, the double woven gauze fabric is formed by laminating a surface-layer gauze weave construction A and a back-layer gauze weave construction B. The gauze weave construction is composed of a wrap yarn (lengthwise yarns on a loom) and a weft yarn (crosswise yarns on a loom). The gauze weave construction is formed by drawing the weft yarn across the warp yarn while the warp yarn is supplied. Concurrently with formation of the surface-layer gauze weave construction A and formation of the back-layer gauze weave construction B, the surface-layer gauze weave construction A and the back-layer gauze weave construction B are joined together, as appropriate. The connection part may be formed by the warp yarn or the connection part may be formed by the weft yarn.

Figure 1:
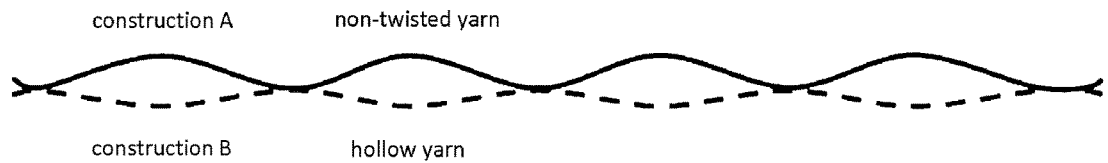
FIG. 1 is a schematic cross-sectional view of a double woven gauze fabric according to a first embodiment.

FIG. 1 is a schematic cross-sectional view according to the present embodiment. Detailed illustration is omitted with respect to the warp yarn and the weft yarn (see, FIG. 14). The present embodiment is characterized in that the surface-layer gauze weave construction A is composed of non-twisted yarn and the back-layer gauze weave construction B is composed of hollow yarn. In other words, the present embodiment does not include a gauze weave construction composed only of twisted yarn (solid yarn).

A yarn count of 16-40 (e.g., single yarn of 20 count) is used for non-twisted yarn and a yarn count of 16-40 (e.g., single yarn of 20 count) is used for hollow yarn. Here, the single yarn of 20 count corresponds to a double yarn of 40 count. Further, since the non-twisted yarn puffs up more than the yarn count as it is displayed, it is preferred to employ a yarn count slightly thinner (larger yarn count) than or equivalent to a yarn count of the hollow yarn.

The non-twisted yarn is formed by untwisting a twisted yarn to return the yarn to a non-twisted state. Here, the non-twisted yarn of which adjustable range of untwisting is −10 to 10% (e.g., range of untwisting is 90-110% with respect to 100% twisting) is substantially treated as non-twisted yarn. To untwist the twisted yarn, the methods typically employed are, for example, a method for twisting a twisted yarn and a water-soluble yarn together and a method for intertwisting a roving and a water-soluble yarn together at the last process of spinning. An intertwisted yarn which is formed such that a fine twisted yarn is twisted and untwisted on a surface-layer to finally return to a substantially untwisted state is also treated as non-twisted yarn.

The hollow yarn is formed in such a manner that a single or a plurality of gaps are formed within the yarn by using a fiber having solubility. A volume ratio of gaps with respect to the whole yarn is referred to as hollow ratio and the hollow ratio is set to 20-50%. It is hard to produce a desirable effect (detailed description will follow) with the hollow ratio less than 20%. A large deformation occurs to crush the hollow with the hollow ratio beyond 50%. The hollow ratio out of the appropriate range results in inviting lack of strength and so on. Such hollow yarn is unsuitable for practical use. More preferred hollow ratio is 20-40%.

~Principle~

A basic principle of the invention according to the present application will be confirmed below. A shrinkage rate differs between the gauze weave construction composed of twisted yarn and the gauze weave construction composed of non-twisted yarn. In other words, the twisted yarn is likely to shrink whereas the non-twisted yarn is hard to shrink. As a result, the gauze weave construction composed of non-twisted yarn puffs up and tends to generate wrinkles.

To solve the above described problem, the hollow ratio was studied in the invention of the present application. That is, the invention is directed to control the shrinkage rate of hollow yarn. As a result, the degree of generation of wrinkles can be controlled according to the use thereof.

The inventor of the present application studied about the relationship between the hollow ratio and the shrinkage rate by using a cotton yarn of 20 count (converting to a single yarn). It is to be noted that there is no strict definition of the shrinkage rate because the shrinkage rate changes between when the cotton yarn is formed into cloth or when the cotton yarn is left as it is and, in the case of cloth, the shrinkage rate also changes according to how the cloth is woven. The shrinkage rate also changes according to a state of yarn, i.e., according to a type of raw cotton as a raw material and the twisting number of a twisted yarn (and a hollow yarn).

The inventor measured shrinkage rates of cloths and yarns in many actual cases. The shrinkage rate referred to here is calculated by ((length before being shrunk)−(length after being shrunk))/(length before being shrunk)×100. In the typical twisted yarn (solid yarn), the shrinkage rate varied in a range between 8% and 12%. Therefore, for convenience of explanation, the shrinkage rate of twisted yarn is assumed as 10% (e.g., a yarn of 100 mm length shrinks to 90 mm).

In the hollow yarn, the shrinkage rate varied in a range between 5% and 9%. It was observed that the shrinkage rate tended to be smaller as the hollow ratio became larger. In the hollow yarn, because a cavity is formed by melting a core portion during the process of forming cloth, bundling among the fibers in the hollow yarn becomes weak and the yarn becomes hard to shrink. For convenience of explanation, assumption was made as follows: the shrinkage rate is 9% when the hollow ratio is 10%; the shrinkage rate is 8% when the hollow ratio is 20%; the shrinkage rate is 7% when the hollow ratio is 30%; the shrinkage rate is 6% when the hollow ratio is 40%; and the shrinkage rate is 5% when the hollow ratio is 50%.

In the non-twisted yarn, the shrinkage rate varied in a range between −5% and 0%. Generally, the non-twisted yarn has such a construction that a water-soluble yarn is wound around the typical twisted yarn or roving. Therefore, after the water-soluble yarn is twisted together, a length of yarn becomes shorter than the original length because the twisting makes the yarn shrink. It looks as if the yarn extends but not shrinks. In other words, it is difficult to perform an accurate measurement. Alternatively, in a case where a fine twisted yarn is employed instead of the water-soluble yarn, the resulting yarn will almost not shrink. The shrinkage rate of non-twisted yarn was assumed as 0% for the sake of making a comparison of length with the length before the water-soluble yarn was twisted together.

Incidentally, the above described numerical values are assumed considering the convenience of explanation and thus are not restrictive.

Taking the above into consideration, when it is desirable to suppress generation of wrinkles, a hollow yarn having a large hollow ratio is to be employed. This makes a difference in shrinkage rate small between hollow yarn and non-twisted yarn. In a case where generation of wrinkles is acceptable or in a case where generation of wrinkles is preferable, a hollow yarn having a small hollow ratio is to be employed.

A hollow yarn having hollow ratio beyond 50% is not suitable for practical use. When a hollow yarn having hollow ratio less than 20% is employed, an effect of employing the hollow yarn is not clear because a remarkable difference is not seen between the hollow yarn and the solid yarn.

Comparison Example

Before comparing the present embodiment with comparison examples 1 to 3 for the sake of explanation of the effects of the present embodiment, the comparison examples 1 to 3 will be described below.

Figure 2:
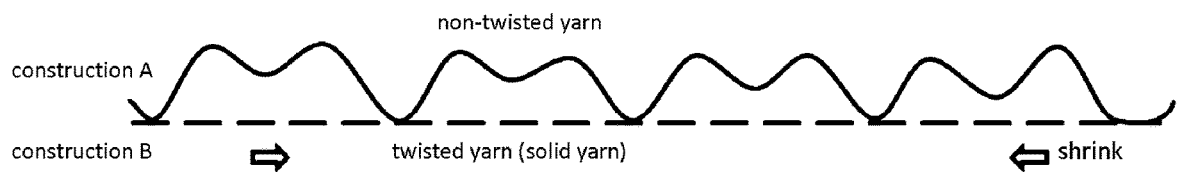
FIG. 2 is a schematic cross-sectional view of a double woven gauze fabric according to a comparison example 1.

FIG. 2 is a schematic cross-sectional view of the double woven gauze fabric according to the comparison example 1. The comparison example 1 is a double woven gauze fabric formed by joining a gauze weave construction A composed of non-twisted yarn and a gauze weave construction B composed of twisted yarn (solid yarn). Because of a difference in shrinkage rate, more (large) wrinkles are generated on the gauze weave construction A composed of non-twisted yarn. A degree of generation of wrinkles cannot be controlled in the comparison example 1.

Figure 3:
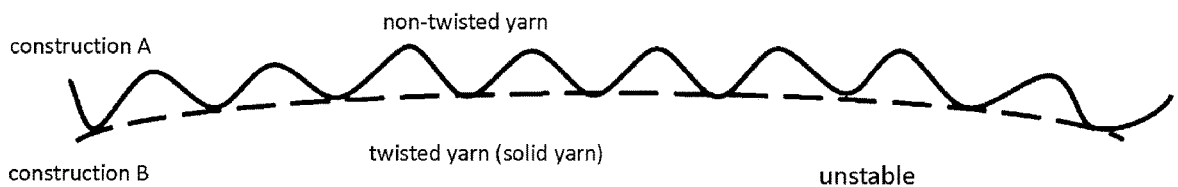
FIG. 3 is a schematic cross-sectional view of a double woven gauze fabric according to a comparison example 2.

FIG. 3 is a schematic cross-sectional view of a double woven gauze fabric according to the comparison example 2. The comparison example 2 is a modification of the comparison example 1. More specifically, by controlling a joining interval, generation of wrinkles can be suppressed to some extent. When the joining interval is narrowed, the number of connection parts increases which results in increasing undesirable man-hours and restricting a design. In consequence of limiting of the shrinkage of the gauze weave construction B composed of twisted yarn, unexpected stress occurs to make the gauze weave construction A of which cloth itself is composed of non-twisted yarn be curved to puff up. This makes a shape of cloth unstable.

Figure 4:
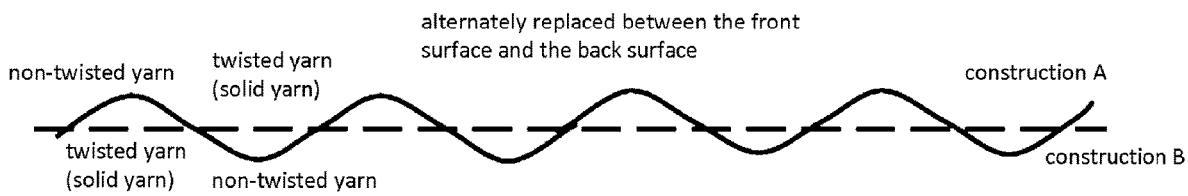
FIG. 4 is a schematic cross-sectional view of a double woven gauze fabric according to a comparison example 3.

FIG. 4 is a schematic cross-sectional view of a double woven gauze fabric according to the comparison example 3. The comparison example 3 is a double woven gauze fabric in which the gauze weave construction A composed of non-twisted yarn and the gauze weave construction B composed of twisted yarn (solid yarn) in the comparison example 1 cross to each other at connection parts regularly to be alternately replaced between the front surface and the back surface. FIG. 4 illustrates that the gauze weave construction A and the gauze weave construction B cross in a warp yarn direction to be alternately replaced between the front surface and the back surface and, in a depth direction in FIG. 4, the connection parts are continuously made to form a linear line. Similarly, the gauze weave construction A and the gauze weave construction B cross in a weft yarn direction to be alternately replaced between the front surface and the back surface. Accordingly, the double woven gauze fabric is sectioned to form a lattice shape continuously regularly repeated in both the front surface and the back surface (see, FIG. 6). Further, changing of colors of the gauze weave construction A and the gauze weave construction B forms a checker flag pattern.

Because of a difference in shrinkage rate, the gauze weave construction A composed of non-twisted yarn protrudes with respect to the gauze weave construction B composed of twisted yarn. To the contrary, the gauze weave construction B composed of twisted yarn dents with respect to the gauze weave construction A composed of non-twisted yarn.

At the time, by studying a size of lattice shape, more specifically, by narrowing the joining interval as it was done in the comparison example 2, generation of wrinkles can be suppressed. In other words, the gauze weave construction A composed of non-twisted yarn puffs up softly.

The lattice shape limits the shrinkage of the gauze weave construction B composed of twisted yarn, and thus stress is generated like it occurred in the comparison example 2. Here, since the stress is generated equally and uniformly on the front surface and the back surface, the stress on both surfaces are counterbalanced. As a result, a shape of cloth is stable different from the case of the comparison example 2.

The above consequence can be realized only in a case of a design in which the lattice shape is continuously repeated. That is, only a low freedom is allowed on design.

Effect

By comparing the present embodiment with the comparison examples 1 to 3, effects unique to the present embodiment will be described below.

In the present embodiment, a degree of generation of wrinkles can be controlled better than the case of the comparison example 1.

In the present embodiment, the degree of generation of wrinkles is controlled by studying the hollow ratio. The present embodiment has better stability of cloth than the case of the comparison example 2.

In the present embodiment, the degree of generation of wrinkles is controlled by studying the hollow ratio, and the first gauze weave construction and the second gauze weave construction keep their positions between the front surface and the back surface. Therefore, the present embodiment has higher freedom of design than the case of the comparison example 3.

In other words, in the present embodiment, the degree of generation of wrinkles can be controlled without degrading the stability of cloth and the freedom of design.

Use of a hollow yarn having a small hollow ratio aggressively generates wrinkles. Accordingly, a unique flavor formed by wrinkles is realized. Further, the heat-retaining property, the soft touch feeling, and the transparency preventing property improve more.

Use of a hollow yarn having a large hollow ratio reduces a difference in shrinkage rate between the hollow yarn and the non-twisted yarn. This can suppress the generation of wrinkles. The gauze weave construction A composed of non-twisted yarn will not get large wrinkles but puffs up softly. This enables easy sewing and easy printing of a picture pattern. As a result, application range of the cloth expands to, for example, clothes.

Now, a supplementary effect will be described below. The present embodiment is a modification of the comparison example 1 and thus produces the similar effect. More specifically, the woven gauze fabric comes to have the heat-retaining property, the soft touch feeling, and the transparency preventing property because of the use of non-twisted yarn and retains the strength as well because of the use of hollow yarn.

Further, the heat-retaining property, the soft touch feeling, and the lightweight property improve because of the use of hollow yarn.

As a matter of course, the present embodiment retains the lightweight property and the breathability as the woven gauze fabric.

~Modification~

In the present embodiment, it is supposed to employ the non-twisted yarn for warp yarn and weft yarn in the surface-layer gauze weave construction A and the hollow yarn for warp yarn and weft yarn in the back-layer gauze weave construction B. If the non-twisted yarn is included to the extent that the non-twisted yarn can produce its function enough (e.g., a ratio of non-twisted yarn is more than the half of the weave construction), the gauze weave construction is substantially treated as gauze weave construction including non-twisted yarn. Further, if the hollow yarn is included to the extent that the hollow yarn can produce its function enough (e.g., a ratio of hollow yarn is more than the half of the weave construction), the gauze weave construction is substantially treated as gauze weave construction including hollow yarn.

A case where the twisted yarn (solid yarn) is employed unrelated to the technical concept of the present application (e.g., employed as a sewing thread), the twisted yarn may be excluded from the constituent features of the invention.

Further, even in a case where the non-twisted yarn is mainly used for warp yarn or a case where the non-twisted yarn is mainly used for weft yarn, if the non-twisted yarn is included to the extent that the non-twisted yarn can produce its function enough (e.g., a ratio of the non-twisted yarn is more than the half of the weave construction), the gauze weave construction is treated as gauze weave construction substantially including the non-twisted yarn. Even in a case where the hollow yarn is mainly used for warp yarn or a case where the hollow yarn is mainly used for weft yarn, if the hollow yarn is included to the extent that the hollow yarn can produce its function enough (e.g., a ratio of the hollow yarn is more than the half of the weave construction), the gauze weave construction is treated as gauze weave construction substantially including the hollow yarn.

Second Embodiment

Figure 5:
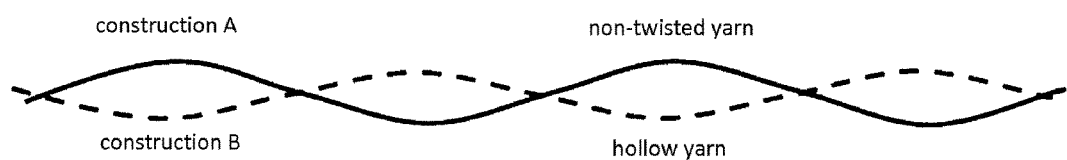
FIG. 5 is a schematic cross-sectional view of a double woven gauze fabric according to a second embodiment.
Figure 6:
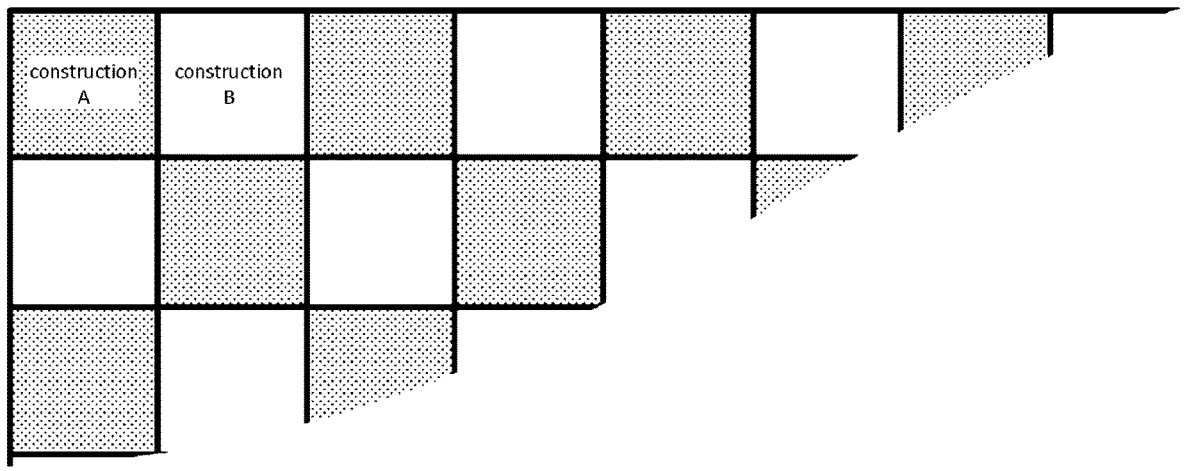
FIG. 6 is a schematic plan view of the double woven gauze fabric according to the second embodiment.

FIG. 5 is a schematic cross-sectional view of a double woven gauze fabric according to a second embodiment. Detailed description of the warp yarn and the weft yarn will be omitted here. In the second embodiment, the invention of the present application is applied to the comparison example 3. FIG. 6 is a schematic plan view of the double woven gauze fabric according to the second embodiment.

In other words, the second embodiment is a woven gauze fabric in which a gauze weave construction A composed of non-twisted yarn and a gauze weave construction B composed of hollow yarn cross to each other at connection parts regularly to be alternately replaced between the front surface and the back surface. The gauze weave construction A and the gauze weave construction B cross in both the warp yarn direction and the weft yarn direction to be alternately replaced between the front surface and the back surface. With the construction, the double woven gauze fabric is sectioned to form a lattice shape continuously regularly repeated on both the front surface and the back surface. Further, changing of colors of the gauze weave construction A and the gauze weave construction B forms a checker flag pattern.

In the comparison example 3, (only) by studying the size of lattice shape, the degree of generation of wrinkles is controlled. More specifically, generation of wrinkles is suppressed by making the size of lattice shape be smaller.

To the contrary, in the second embodiment, the degree of generation of wrinkles is controlled by studying the size of lattice shape and the hollow ratio.

Therefore, in the second embodiment, the degree of generation of wrinkles can be controlled to the extent equivalent to the case of the comparison example 2 even when the size of lattice shape is made lager than that of the comparison example 3. That is, the restriction of design is reduced in the comparison example 3.

Figure 7:
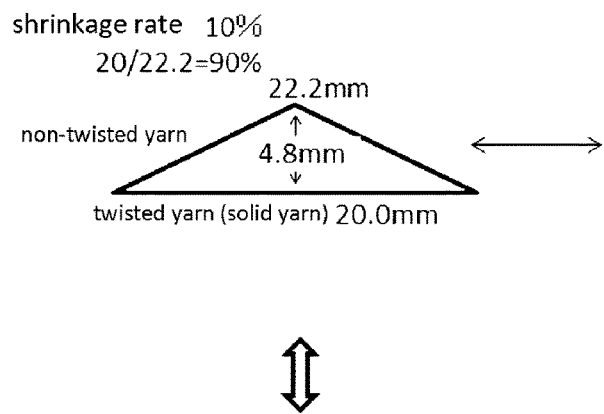
FIG. 7 is a schematic view for verifying an effect of the second embodiment by a numerical calculation in comparison with the comparison example 3.
Figure 7:
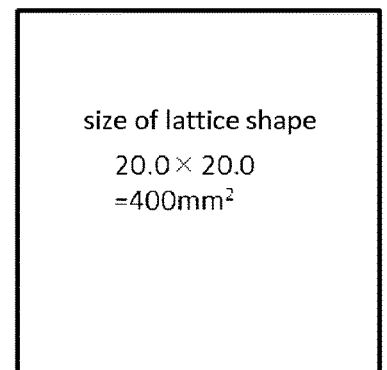
Figure 7:
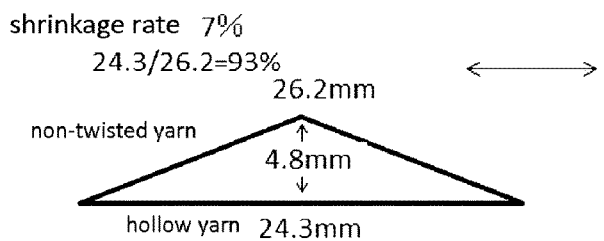
Figure 7:
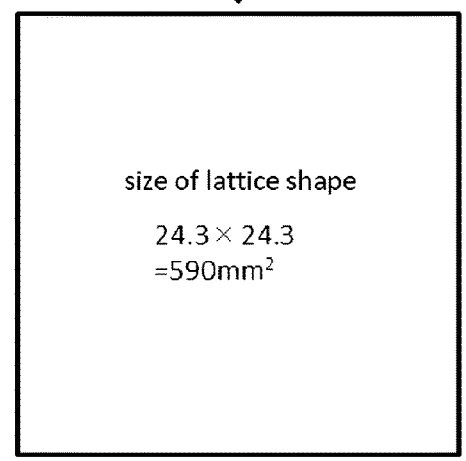

FIG. 7 is a schematic view for verifying the effect of the second embodiment by numerical calculation in comparison with the comparison example 3.

In the comparison example 3, the shrinkage rate of twisted yarn is set to 10%. When the size of lattice shape is set to 20×20 mm, a unit length of non-twisted yarn (corresponding to a length of a side of lattice shape) comes to be 22.2 mm and a unit length of twisted yarn comes to be 20.0 mm. As a result, the woven gauze fabric puffs up to 4.8 mm on geometric calculation.

In the second embodiment, the shrinkage rate of hollow yarn (e.g., having the hollow ratio of 30%) is set to 7%. To make the gauze fabric puff up to 4.8 mm alike the case of the comparison example 3, a unit length of non-twisted yarn comes to be 26.2 mm and a unit length of twisted yarn comes to be 24.3 mm, and a size of lattice shape comes to be 24.3×24.3 mm.

As described above, in the second embodiment, even when the size of lattice shape is made 122% (area ratio of 148%) larger than that of the comparison example 3, puffing up of the woven gauze fabric of the second embodiment can be suppressed to a degree equivalent to that of the comparison example 3 on numerical calculation.

The second embodiment has a characteristic weave construction equivalent to the first embodiment and thus the equivalent effect can be expected.

Third Embodiment

Figure 8:
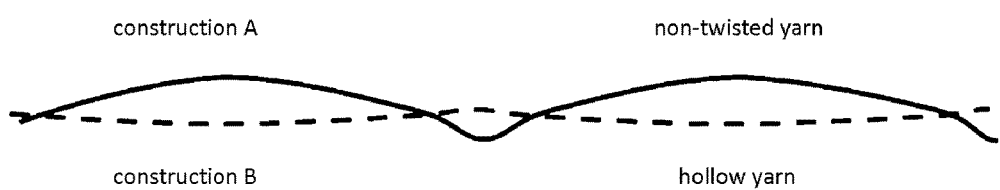
FIG. 8 is a schematic cross-sectional view of a double woven gauze fabric according to a third embodiment.
Figure 9:
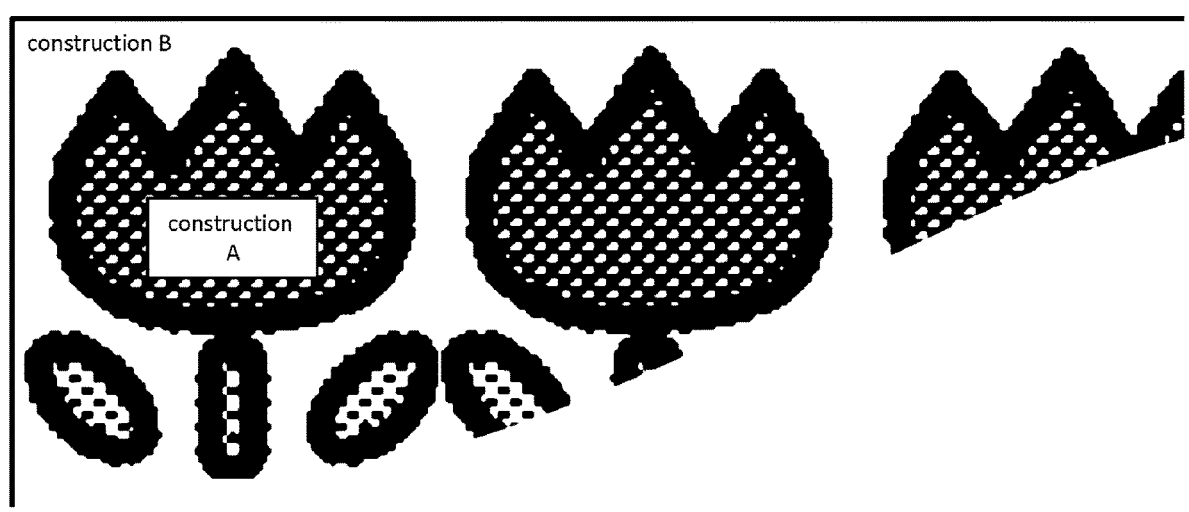
FIG. 9 is a schematic plan view of the double woven gauze fabric according to the third embodiment.

FIG. 8 is a schematic cross-sectional view of a double woven gauze fabric according to the third embodiment. Detailed description of the warp yarn and the weft yarn will be omitted here. The third embodiment is a modification of the second embodiment. FIG. 9 is a schematic plan view according to the third embodiment.

More specifically, the third embodiment is a woven gauze fabric in which a gauze weave construction A composed of non-twisted yarn and a gauze weave construction B composed of hollow yarn cross to each other at connection parts to be alternately replaced between the front surface and the back surface. A difference is that the gauze weave construction A and the gauze weave construction B are alternately replaced between the front surface and the back surface regularly in the second embodiment, whereas the gauze weave construction A and the gauze weave construction B are alternately replaced between the front surface and the back surface at connection parts positioned arbitrarily in the third embodiment.

The degree of generation of wrinkles is controlled by studying the size of lattice shape and the hollow ratio in the second embodiment, whereas the degree of generation of wrinkles is controlled by studying (only) the hollow ratio in the third embodiment.

A free picture pattern is formed, without the design being limited to a checker flag pattern, by alternately replacing the gauze weave construction A and the gauze weave construction B between the front surface and the back surface at arbitrary positions (irregularly) and by changing colors of the gauze weave construction A and the gauze weave construction B.

Incidentally, the third embodiment has a characteristic weave construction equivalent to the first embodiment and thus equivalent effect can be expected.

Fourth Embodiment

The double woven gauze fabric has been referred to in the first embodiment to the third embodiment. It is also possible to apply the invention of the present application to a triple woven gauze fabric.

FIGS. 10 to 13 are a schematic cross-sectional view illustrating each example according to the fourth embodiment.

Figure 10:
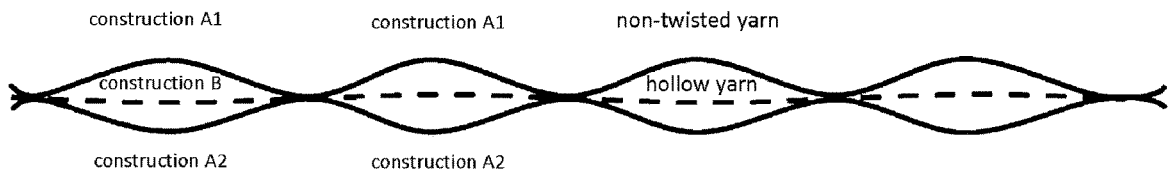
FIG. 10 is an example of a triple woven gauze fabric according to a fourth embodiment.

A triple woven gauze fabric illustrated in FIG. 10 is a modification of the first embodiment. A gauze weave construction A1 and a gauze weave construction A2 are composed of non-twisted yarn and a gauze weave construction B is composed of hollow yarn. The gauze weave construction A1 and the gauze weave construction A2 are provided on each respective surface of the gauze weave construction B to form a laminated weave construction. The gauze weave construction A1 and the gauze weave construction A2 may be directly joined by passing through the gauze weave construction B. Alternatively, the gauze weave construction A1 and the gauze weave construction A2 may be indirectly joined via the gauze weave construction B.

Figure 11:
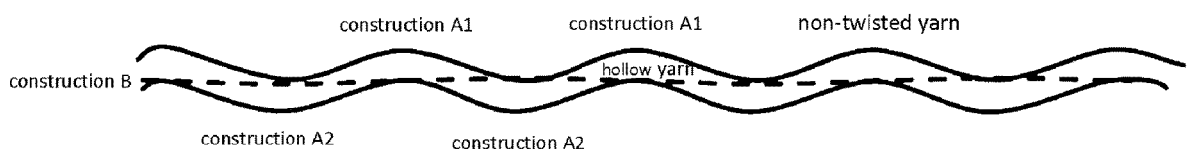
FIG. 11 is another example of the triple woven gauze fabric according to the fourth embodiment.

A triple woven gauze fabric illustrated in FIG. 11 is a modification of FIG. 10. A gauze weave construction A1 and a gauze weave construction A2 are composed of non-twisted yarn and a gauze weave construction B is composed of hollow yarn. The gauze weave construction A1 and the gauze weave construction A2 are provided on each respective surface of the gauze weave construction B to form a laminated weave construction. The gauze weave construction A1 and the gauze weave construction A2 are indirectly joined via the gauze weave construction B. A connection part joining the gauze weave construction A1 and the gauze weave construction B is positioned at a center position between the neighboring connection parts joining the gauze weave construction A2 and the gauze weave construction B. A connection part joining the gauze weave construction A2 and the gauze weave construction B is positioned at a center position between the neighboring connection parts joining the gauze weave construction A1 and the gauze weave construction B.

Figure 12:
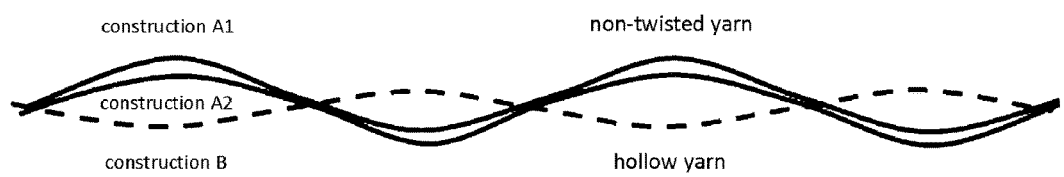
FIG. 12 is further another example of the triple woven gauze fabric according to the fourth embodiment.

A triple woven gauze fabric illustrated in FIG. 12 is a modification of the second embodiment. A gauze weave construction A1 and a gauze weave construction A2 are composed of non-twisted yarn and a gauze weave construction B is composed of hollow yarn. The gauze weave construction A1 and the gauze weave construction A2 are laminated together and the laminated gauze weave construction A and gauze weave construction B cross each other at connection parts regularly to be alternately replaced between the front surface and the back surface.

Figure 13:
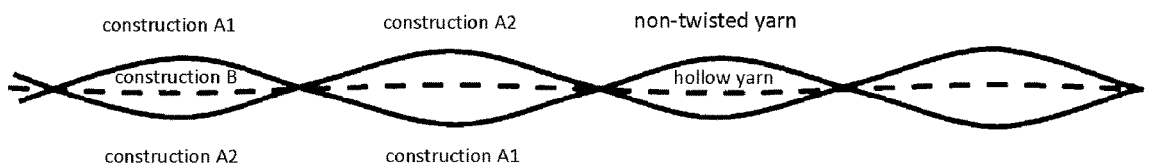
FIG. 13 is still further another example of the triple woven gauze fabric according to the fourth embodiment.

A triple woven gauze fabric illustrated in FIG. 13 is a modification of FIG. 12. A gauze weave construction A1 and a gauze weave construction A2 are composed of non-twisted yarn and the gauze weave construction B is composed of hollow yarn. While placing the gauze weave construction B as a middle layer, the gauze weave construction A1 and the gauze weave construction A2 cross each other via the gauze weave construction B at connection parts regularly to be alternately replaced between the front surface and the back surface.

<Application Example of Cloth>

As described above, the multiple woven gauze fabric of the invention according to the present application controls the degree of generation of wrinkles, while retaining the characteristics of woven gauze fabric and characteristics of non-twisted yarn and hollow yarn, by studying the hollow ratio. Particularly, suppression of generation of wrinkles makes it easy to sew, print a picture pattern, and form a picture pattern by using different colors of yarns. This enhances freedom of design for cloth.

As a result, the woven gauze fabric of the present invention is suitable not only to gauze towel and handkerchief but also to cloth for clothing (robe, pajamas, undershirt, shorts, muffler, articles for infants, etc.) and beddings (sheet, blanket, pillowcase, etc.).

The invention claimed is:

1. A manufacturing method of a multiple woven gauze fabric,
    wherein the multiple woven gauze fabric comprises:
        at least a first gauze weave construction and a second gauze weave construction; and
        a plurality of connection parts joining the first gauze weave construction and the second gauze weave construction;
    wherein the first gauze weave construction comprises a non-twisted yarn;
    wherein the second gauze weave construction comprises a hollow twisted yarn; and
    wherein wrinkles are generated because of a difference in shrinkage rate between the hollow twisted yarn and the non-twisted yarn,
    wherein the method comprises:
        forming a correlation between a hollow ratio and a shrinkage rate in the hollow twisted yarn;
        selecting a target height of the wrinkles and using the hollow twisted yarn having a hollow ratio according to said target height of the wrinkles;
        laminating and joining the first gauze weave construction and the second gauze weave construction together; and
        controlling a degree of generation of wrinkles by shrinking the hollow twisted yarn based on a difference in shrinkage rate between the hollow twisted yarn and the non-twisted yarn.

* * * * *